UNITED STATES PATENT OFFICE.

ANTON BONATI, OF BIEBRICH, GERMANY, ASSIGNOR TO THE FIRM OF KALLE AND COMPANY, OF BIEBRICH, GERMANY.

SULFUR DYE AND PROCESS OF MAKING SAME.

SPECIFICATION forming part of Letters Patent No. 695,534, dated March 18, 1902.

Application filed January 8, 1902. Serial No. 88,907. (No specimens.)

*To all whom it may concern:*

Be it known that I, ANTON BONATI, a subject of the King of Prussia, Emperor of Germany, residing at Biebrich, Germany, have invented certain new and useful Improvements in Sulfur Dyes and the Process of Making the Same, of which the following is a specification.

In my application, Serial No. 88,906, for a United States Patent of the same date I have described and claimed the manufacture of a blue dye containing sulfur by melting a thiocarbamid-like derivative of the nitroamido-para-oxydiphenylamin together with sodium sulfid and sulfur. By further investigation I have now found that the pure dyestuff may be obtained from the crude melt in an easy and simple manner. I describe this method of purification in the following example:

Six kilos of the crude melt obtained by the process described in my above-mentioned specification are dissolved in seventy liters of water. Through this solution I pass a current of air, adding common salt until the separation of the coloring-matter is finished, which is then filtered, pressed, and dried. This purified dyestuff represents a blue-black powder, very little soluble in water, with greenish-blue color, easily soluble in an aqueous solution of sodium sulfid with blue color. The solution in water containing sodium sulfid turns almost colorless on heating, showing only a very pale yellow or green tincture, but regains its original blue color on exposure to the air.

In concentrated sulfuric acid the new product is difficultly soluble, yielding a blue solution. It dyes unmordanted cotton from a bath containing sodium sulfid and salt greenish-blue shades, which become brighter and more reddish blue, as well as very fast to light and washing, by a treatment with hydrogen peroxid and stannic chlorid.

Now what I claim is—

1. The herein-described process of making a sulfur dye, which consists in dissolving in water the crude melt obtained by melting the thiocarbamid of the para-nitro-ortho-amido para (1) oxydiphenylamin together with sodium sulfid and sulfur, and passing a current of air through the so-obtained solution adding common salt, until no more of the coloring-matter is precipitated.

2. As a new product the sulfur dye soluble in water with greenish-blue color, which turns blue on addition of sodium sulfid and pale yellow to green on subsequent boiling, dyeing on unmordanted cotton greenish-blue shades which become brighter and more reddish blue on treatment with hydrogen peroxid and stannic chlorid.

In testimony whereof I have signed my name to this specification in the presence of two subscribing witnesses.

ANTON BONATI.

Witnesses:
JEAN GRUND,
IGNAZ ROSENBERG.